(12) United States Patent
Gerde

(10) Patent No.: US 8,348,673 B2
(45) Date of Patent: Jan. 8, 2013

(54) DEVICE FOR STUDYING INTERACTION BETWEEN PARTICLES AND LUNGS

(75) Inventor: Per Gerde, Västerljung (SE)

(73) Assignee: Inhalation Sciences Sweden AB, Stockholm (SE)

( * ) Notice: Subject to any disclaimer, the term of this patent is extended or adjusted under 35 U.S.C. 154(b) by 538 days.

(21) Appl. No.: 12/664,141

(22) PCT Filed: Jun. 11, 2008

(86) PCT No.: PCT/SE2008/050698
§ 371 (c)(1),
(2), (4) Date: Feb. 23, 2010

(87) PCT Pub. No.: WO2008/153493
PCT Pub. Date: Dec. 18, 2008

(65) Prior Publication Data
US 2010/0196866 A1    Aug. 5, 2010

Related U.S. Application Data

(60) Provisional application No. 60/934,070, filed on Jun. 11, 2007.

(51) Int. Cl.
*G09B 23/28* (2006.01)

(52) U.S. Cl. .................................................. 434/272

(58) Field of Classification Search .............. 434/262, 434/267, 268, 272, 276, 295; 141/70, 83
See application file for complete search history.

(56) References Cited

U.S. PATENT DOCUMENTS 3,550,347 A * 12/1970 Coates ........................... 53/473
4,092,845 A    6/1978 Prodi et al.
4,593,563 A    6/1986 Laine et al.
(Continued)

FOREIGN PATENT DOCUMENTS

DE    2154594 A1    5/1973
(Continued)

OTHER PUBLICATIONS

Hofman et al, "Stochastic model of ultrafine particle deposition and clearance in the human respiratory tract," Radiation protection dosimetry, England 2003, 105(1-4):77-80.

(Continued)

*Primary Examiner* — Kurt Fernstrom
(74) *Attorney, Agent, or Firm* — Porter Wright Morris & Arthur LLP

(57) ABSTRACT

An arrangement and a method for studying the dissolution of particles in the air/blood barrier of the respiratory tract. A device for simulating the interaction of particles (203) delivered to the air/blood barrier of the respiratory tract comprises: a perfusion chamber (101) adapted to receive and deliver a flow of perfusion fluid; a semi permeable membrane (205) coated on one side with a barrier layer (204) adapted to interact with the particles; and a first sheet formed organ (202) having a surface distributed with the particles. The membrane (205) is arranged to be a fluid contact with the perfusion fluid, while the first sheet formed organ (202) is arranged to contact the barrier layer (204) of the membrane (205), in order to simulate the dissolution of the particles (203) in the air/blood barrier when perfusion fluid flows through the perfusion chamber (101), along the membrane (205). Providing a flow of perfusion fluid along the membrane simulates more accurately the natural process of the air/blood barrier.

24 Claims, 2 Drawing Sheets

U.S. PATENT DOCUMENTS

| | | | |
|---|---|---|---|
| 5,199,877 A * | 4/1993 | Page | 434/262 |
| 5,679,580 A * | 10/1997 | Ball et al. | 436/177 |
| 5,882,207 A * | 3/1999 | Lampotang et al. | 434/268 |
| 6,921,267 B2 * | 7/2005 | van Oostrom et al. | 434/272 |
| 7,100,461 B2 * | 9/2006 | Bradley et al. | 73/864.33 |
| 8,096,199 B2 * | 1/2012 | Riazanskaia et al. | 73/864.33 |
| 2003/0180954 A1 | 9/2003 | Riviere et al. | |
| 2006/0288805 A1 | 12/2006 | Das et al. | |
| 2007/0259322 A1 * | 11/2007 | Yuasa et al. | 434/262 |

FOREIGN PATENT DOCUMENTS

EP    1308710 A2    5/2003

OTHER PUBLICATIONS

Darquene et al, "Aerosol dispersion in human lung: Comparison between numerical simulations and experiments for bolus tests," Journal of Applied Physiology, US 1997, 83(3):966-974.

* cited by examiner

DEVICE FOR STUDYING INTERACTION BETWEEN PARTICLES AND LUNGS

RELATED APPLICATION

This application is a 371 of PCT/SE2008/050698 filed Jun. 11, 2008 and claims priority under 35 U.S.C. §119 of U.S. application Ser. No. 60/934,070 filed Jun. 11, 2007.

FIELD OF INVENTION

The present invention is directed to improvements related to the study of how airborne particles interact with lungs including device and methods adapted to simulate the rate of dissolution of dry powder drugs in the lungs.

BACKGROUND OF THE INVENTION

For dry powder aerosols, dissolution into the lung medium is a critical factor in the fate of inhaled drugs. Slow dissolution can be used as a strategy to increase the duration of a drug in the lungs. However, slow dissolution may also cause a substantial fraction of inhaled particles to be redistributed to the gastro-intestinal tract with the mucociliary escalator or to be phagocytosed by alveolar macrophages and potentially degraded in their digestive organelles (Lundborg, Falk et al. 1992). Measuring dissolution of soluble particles in the lungs is very difficult. For more rapid-soluble substances indirect methods must be used such as the appearance of the solute in the circulation after an inhalation exposure. Slowly dissolved particles, such as some particulate radionuclides, are quantitated after the recovery of the particles from harvested lung tissues. A number of methods have been devised to simulate the rate of dissolution of solid particles in the lungs. Most of these methods are intended for complex particles of environmental origin with a low-solubility to insoluble core. Examples are radioactive particles (Kanapilly, Raabe et al. 1973), mineral particles or fibers (Johnson 1994). Recently, however, a filter method has been devised to simulate the rate of dissolution of drugs in the lungs (Davies and Feddah 2003). The drug particles are deposited on a glass fiber filter and then placed in a filter cassette. The filter is eluted in a flow-through configuration and the single pass eluate is repeatedly analyzed for the dissolved drug. There is room for improvements in finding more accurate, reliable and physiologically correct models to study how drug particles interact and dissolve in lung tissues.

DESCRIPTION OF THE INVENTION

In this description the term "air/blood barrier" means the interface between the air and the tissue of the respiratory tract. Typically, the mucosal tissue of the conducting airways and the alveolar tissue of a lung are examples of air/blood barriers.

The present invention in its most generalized form is a device for studying the interaction of particles with lung fluids and cells. The device comprises of a perfusion chamber, a semi permeable membrane and a sheet formed organ having a surface distributed with particles.

The perfusion chamber is adapted to receive and deliver a flow of a perfusion fluid. A semi-permeable membrane, coated on one side with a barrier layer, is arranged to be in fluid contact with the perfusion fluid. The device further comprises a first sheet formed organ, having a surface distributed with particles, arranged to be in contact with the barrier layer of the membrane. The barrier can constitute either a physicochemical- or a biological barrier adapted to resemble or mimic a natural membrane of epithelial cells in the lungs. In the present arrangement the physicochemical barrier consists of a polycarbohydrate gel to mimic the airway mucus and a phospholipid dispersion to mimic the lipid membranes of the epithelial cells. In another example, a biological barrier of epithelial cells is added to the gel layer to enable study of even active transport mechanisms in the barrier. In one aspect, the barrier is a gel which is isotonic with the perfusion fluid and adapted to receive the particles. In one embodiment, the gel may comprise phospholipid dispersion. In another embodiment, the gel comprises a dispersed phospholipid which is further provided with an interface comprising monolayers (such as ten layers) of phospholipids or suitable amphiphilic lipids in order to mimic the surfactant layer on top of the mucous lining layer of the lungs. In another aspect to provide a biological barrier, epithelial cells are provided as a barrier layer to enable even active transport mechanisms in the barrier.

The perfusion chamber comprises means for establishing a fluid connection for inlet and outlet perfusion fluid to the chamber, preferably a distance ring provided with channels for transporting the fluid. A perfusion fluid is flowing through the perfusion chamber, along the entire membrane, in order to simulate the dissolution and absorption of solutes emanating from the particles in the lungs. The perfusion flow will receive the agent dissolved and diffused through the barrier layer and membrane and then be transported away for subsequent analysis.

It is an important feature that the perfusion fluid is intended to flow along the membrane coated with the particles, in contrast to solutions where a perfusion fluid is intended to flow through the membrane. A flow of perfusion fluid along the membrane simulates more accurately the natural process of the air/blood barrier.

The perfusion chamber further comprises an upper sheet formed organ, e.g. a cover glass. The chamber preferably comprises; a second upper sheet formed organ, an upper distance means attached to the second upper sheet formed organ on one side and said membrane on the other side, and a lower distance means attached to the membrane on one side and said plate on the other side. The upper distance means preferably is provided with channels for transporting inlet and outlet perfusion fluids. In one preferred embodiment, the said chamber is essentially circular from a top view, however other forms such as essentially rectangular is also conceivable. The membrane of the device preferably is made of polycarbonate with pore structures with a diameter and fraction of pore surface area as to provide rapid passage of diffusing species but preventing significant convective movement of fluid through the membrane. In one preferred embodiment the membrane is made of polycarbonate and has pore diameters of about 0.01-1 µm. However, other materials of the membrane, sizes of the pores, and running conditions could be chosen in order to adjust the device to different sorts of airborne particles with different agents for dissolution.

The first sheet formed organ preferably is adapted so the dissolution can be studied with an optical detector. The barrier layer is either a physicochemical or a biological barrier adapted to resemble or mimic a natural membrane of epithelial cells in the lungs. In one aspect, the barrier is a gel which is isotonic with the perfusion fluid and adapted to receive the particles. In one embodiment, the gel is a polycarbohydrate gel which comprises dispersed phospholipids. In another embodiment, the gel comprises a dispersed phospholipid which is further provided with an interface comprising monolayers (such as ten layers) of phospholipid or suitable amphiphilic lipids in order to mimic the surfactant layer on top of the mucous lining layer of the lungs. In another aspect to provide a biological barrier, monolayers of epithelial cells are cultured on the membrane in the gel layer to mimic a living pulmonary epithelium and to provide means for studying even active transport mechanisms in the barrier. The airborne particles preferably are distributed on the plate from a stream of an aerosolized dose form. Preferably the aerosolized particles are in the size range of 0, 3-10 µm including at least one pharmaceutically active compound. Alternatively, the airborne particles are distributed on the plate from an exposure of the plate to an environment comprising airborne particles. The perfusion fluid is generally adapted to interact with the barrier layer in a manner that resembles the natural blood flow. More specifically, it should be a physiologically acceptable fluid with an isotonicity adapted to the isotonicity of the gel layer and if barrier layer comprising living cells is used, it is compatible with the cell type. The person skilled in the art can find many blood-like fluids suggested for organ perfusion which can be useful with applications of the present invention which also generally admits heparinized whole blood as a conceivable perfusion fluid. In a particular embodiment of the invention, the perfusion fluid comprises dispersed amphiphilic lipids, such as phospholipids and buffer, such as an albumin buffer.

In another aspect, the present invention relates to an arrangement for studying the dissolution of particles in the lungs comprises the previously described device, an optical detection equipment, means for collecting fractions of perfusion fluid and means for immobilizing said device to a fixed structure. Preferably the immobilizing means comprises; an upper part with connection tubes for leading perfusion fluids to the chamber and from the chamber, a middle part for immobilizing the membrane against the upper distance means, and a lower part for pressing a sheet formed organ, having a surface distributed with airborne particles, against the membrane.

In a further aspect the present invention relates to a method of preparing the previously described device comprising the steps of providing a perfusion chamber adapted to receive and deliver a flow of perfusion fluid, having a wall consisting of a semi permeable membrane, coating said membrane with a gel layer, turning said device, contacting said gel layer with said first sheet formed organ, having airborne particles distributed on its contacting surface, and immobilizing said first sheet formed structure to said membrane. Contacting and immobilizing may be performed by using a wedge mechanism for displacing the membrane towards the immobilized first sheet formed organ with a perpendicular movement to minimize essentially any disturbances of the original distribution pattern of the particles.

In a still further aspect the present invention relates to a method of studying the interaction between airborne particles comprising the steps of providing a sample from an air stream of particles, providing a the previously described device in the previously described arrangement. The method further comprises the provision of a flow of perfusion fluid to the perfusion chamber, while detecting the dissolution of an agent from said air stream of particles and collecting and analyzing samples from the perfusion fluid. For detecting an optical detector can be employed to record the dissolution of particles, optionally together with digital image analyzing or any similar technology.

The present invention advantageously admits determination of the expected dissolution rate of particular agents which is of significant importance for screening and evaluating drug candidates for administration through the respiratory system. The drug candidate behavior in air/blood interface (e.g. a mucous membrane of the respiratory system) can therefore be carefully analyzed visually/optically, gravimetrically and chemically by analyzing the resulting perfusate. It is also conceivable to estimate the time of appearance of drug candidate in the circulatory system. Accordingly, it is concluded that the present invention represents a powerful tool for rapidly screening for suitable particular solid drugs for administration to respiratory of system and to evaluate formulations for this purpose.

SHORT DESCRIPTION OF THE DRAWINGS

DETAILED AND EXPERIMENTAL PART OF THE DESCRIPTION

Figure 1:
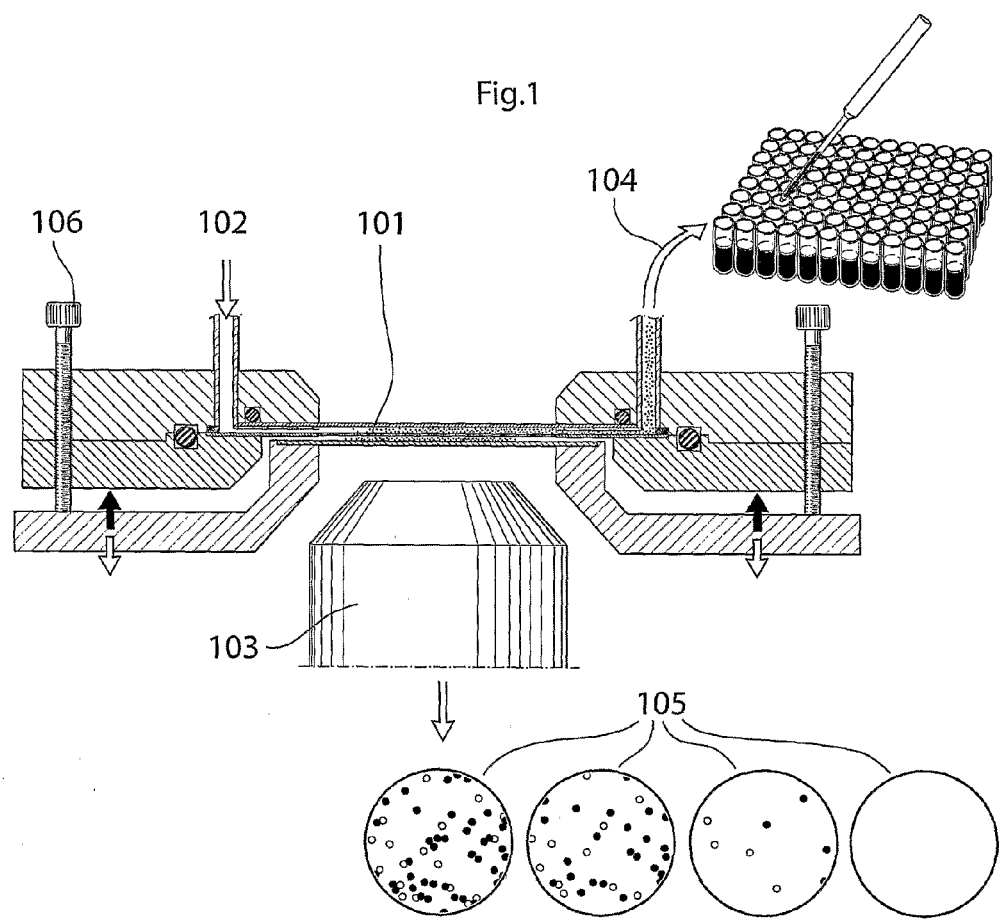
FIG. 1 shows a schematic drawing of an arrangement according to the present invention.

FIG. 1 shows an arrangement according to the present invention for an in-vitro study how particles 203 dissolve in the lung consists of a device comprising perfusion flow chamber 101, a computer-controlled syringe pump 102, and an inverted microscope 103 with a high resolution camera, recording images 105 of the particles 203. Downstream of the flow chamber 101 the perfusate is collected in a computerized fraction collector 104.

Figure 2:
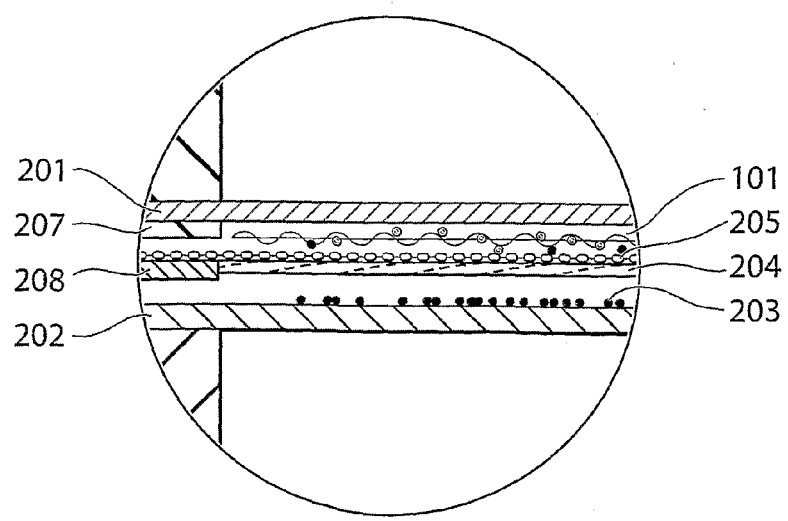
FIG. 2 shows are more detailed view of the perfusion chamber.

The flow through the chamber mimics the physiology of the mucosa and is built up in a cross flow configuration (FIG. 2). During the experiment the model mucosa is confined to the 550 µm space between two parallel cover slips 201 and 202. The drug particles 203 are deposited on top of the 12 mm lower cover slip 202. The drug particles 203 are contacted with a 50 µm gel layer 204 that mimics the epithelial cell layer of the tracheobronchial mucosa. The gel layer rests on a 10 µm polycarbonate membrane 205 that mimics the basal membrane of the airway mucosa. Above the polycarbonate membrane 205 is the 500 µm thick perfusion flow chamber 101. The perfusate flow of the perfusion flow chamber 101 runs along the entire membrane 205 from one side to the other. The perfusate residence time in the chamber is only a few seconds. This is intended to mimic the short passage time of blood in the abundant capillary loops immediately below the basement membrane in the airway mucosa (Laitinen, Laitinen et al. 1989). An upper distance means 207 is adapted to separate the upper cover slip from the membrane 205 and to form the perfusion flow chamber 101. Also, a lower distance means 208 is adapted to separate the membrane 205 from the lower cover slip 202.

Figure 3:
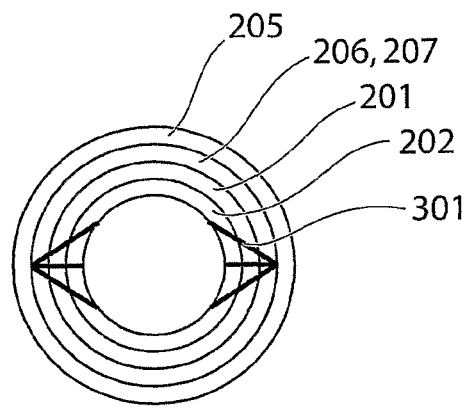
FIG. 3 shows a view of the perfusion chamber with the perfusion channels

FIG. 3 is a horizontal view of the perfusion flow chamber 101, showing the inlet and outlet channels 301, adapted in the distance means 207, for the perfusate. The horizontal cross section of the perfusion flow chamber 101 has an essentially circular form.

The perfusate composition is isotonic with the gel 204 on the other side of the polycarbonate membrane 205. For example the basic composition of the perfusate is an albumin buffer, where phospholipids can be added to increase the extraction capacity towards lipophilic solutes.

The perfusion fluid flow chamber 101 has a diameter of 12 mm and a thickness of 0.5 mm, which gives a volume of 56 µL. The 50 µm gel layer 204 has a volume of 5.7 µL and the penetration portion of the polycarbonate membrane 205 is 1.1

μL giving a total volume of the barrier of 63 μL. For comparison, the thickness of the air-blood barrier in human tracheobronchial epithelium in non-diseased individuals varies from 60 μm in the trachea to 5-8 μm in the bronchioles. In the gas exchange region the air-blood barrier thickness is only some 0.2-1.5 μm. The barrier thickness in the device, thus, corresponds to the tracheal epithelium. Total thickness of the well-perfused portion of the mucosa has in the upper airways has been estimated to be some 200 μm (Gerde and Scott 2001). The total thickness of the device is about 510 μm.

To prepare samples to study with the device, particles 203 can be deposited on the glass cover slips 202 using a modified dustgun generator as described by P Gerde et al. in Inhalation Toxicology, 2004, 16, 42-52. Three cover slips are grouped together in a triangle and will have one mm of their perimeter masked to prevent particle deposition on surfaces not in direct contact with the gel layer. Both a modified aerosol holding chamber as well as a triple glass cover slip holder can be made to allow even deposition on three glass cover slips at a time from one aerosol generating cycle.

When running the arrangement described with FIGS. 1 and 2, the dissolution measurement consists of the following major steps:
1. Preparation of the perfusate and the gel layer 204.
2. Aerosol generation and deposition on glass cover slips 202.
3. Start up of the perfusion flow chamber 101 and gel layer 204.
4. The dissolution experiment under the microscope 103.
5. Image analysis of microscopy recordings.
6. Chemical analysis of eluated perfusate.

The perfusate is based on an albumin buffer with a mix in of phospholipids to increase the extracting capacity towards lipophilic solutes. The phospholipids will be thoroughly sonicated to obtain a stable dispersion. This is of critical importance when the suspension is sitting in the syringe will remain in suspension until it is pumped into the perfusion flow chamber 101. A magnetic stirrer is arranged in the syringe to keep the phospholipids in suspension while sitting in the syringe. The gel 204 is made from a polycarbohydrate suspension (Gerde and Scholander 1989). Several different types of barriers will be tested, including cell suspensions. One cell type that will be tested is the A549.

Aerosols for coating the cover slips 203 are generated with the system described P Gerde et al. in Inhalation Toxicology, 2004, 16, 42-52 to generate a coating from the aerosol per cover slip of approximately 10 μg. The cover slips are placed three at a time into a special holder. After generation, the aerosols are passed over the cover slip holder and into a total filter. A new holding chamber without valves will be designed to maximize the fraction of loaded powder that deposits on the cover slips. With the current chamber about 3×10 μg deposits on the cover slips from 3 mg loaded powder.

The device with the perfusion chamber 101 is prepared with the polycarbonate membrane 205 stretched in place. After the perfusion flow has been connected and remaining air bubbles in the chamber 101 are removed the gel layer 204 is applied. Application of the gel layer 204 with the dispersed phospholipids is performed by pipetting or with a nebulizer. The dissolution curve is calculated by image analysis of the computer stored micrographs of the dissolution process. The initial amount of particulate substance 203 deposited in the barrier 204 is gravimetrically determined before the dissolution experiment.

Figure 4:
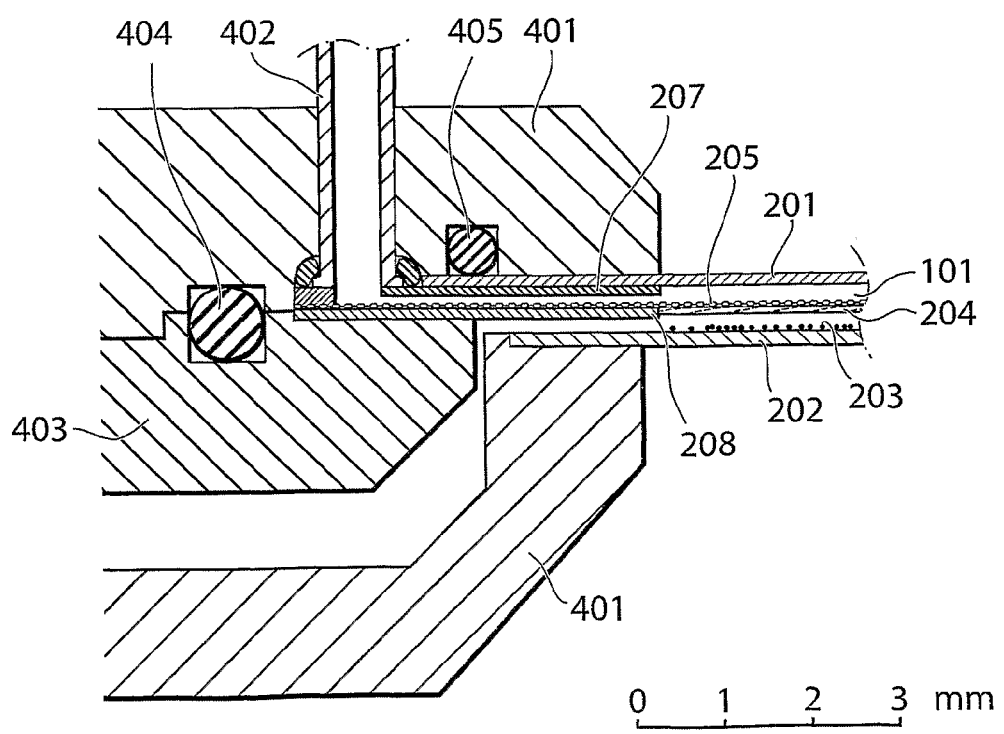
FIG. 4 shows a more detailed view of the fixating means

FIG. 4 shows the fixating means for the device comprising the perfusion flow chamber 101. Only the connection for inlet flow 402 is shown in the figure. However, the figure could be valid for outlet flow instead. The fixating means comprise; an upper barrier module part 401 with connections 402 for inlet and outlet perfusate, a lower barrier module part 403 for fixating the membrane 205 against the upper barrier module part 401. The module parts 401 and 403 are provided with stretching means 405 for stretching the membrane 205 and sealing means 405.

Once the particle cover slip 202 has been placed in its holder 400, which is attached to the microscopy stage, an automatic steering program is started to run the measurement. The focus of the microscope is manually adjusted and the steering program then takes a pre-contact image of the particles 205. The barrier module 401, 403 is lowered onto the particle cover slip 202 and an initial post deposition image is recorded immediately after contact. A first set of images 105 is then recorded to determine the rate of dissolution. Depending on the rate of change between these initial images a data collection schedule is adopted to give a sufficiently good time resolution of the dissolution process.

The optical detection of the dissolution process is made using an inverted microscope 103 and a high resolution digital camera. The particle cover slip 202 with deposited particles 205 is placed on a special holder 400 attached to the microscopy stage. The particles 205 will be brought into focus and the perfusion chamber 101 with gel 204 will be placed on guide pins above the particle cover slip 202. A number of images 105 are recorded before the particles 205 are brought in contact with the gel 204. Immediately after contact a series of fast images 105 are recorded to determine the rate at which dissolution proceeds. Then a sufficiently regular series of images 105 are recorded to determine the entire dissolution process. All images 105 are stored on a computer and the contrast is enhanced to easier mark the particles 203. Dissolution is determined by counting the disappearance of particle-related pixels as a function of time. Different mathematical models are used to link the pixel disappearance with the dissolution of particles.

Also other forms of optical detection could be practiced. Such methods could be based on illuminating the particle cover slip 202 with distributed particles 203, with a light source, and determining the rate of dissolution by studying reflection or refraction of the illuminated light.

Simultaneous to the optical detection of dissolution, absorption is measured by collecting the single-pass perfusate exiting the perfusion flow chamber 101 using a fraction collector 104. Sampling intervals will be adjusted to give a sufficient resolution of the absorption process. Both the dissolution curve and the absorption curve will be plotted against the same time axis. The particle cover slip can also readily undergo gravimetrical analysis to further study the correlation with the chemical analysis of the perfusate and thereby a more complete picture of particle dissolution and absorption processes can be obtained.

References:

Davies, N. M. and M. R. Feddah (2003). "A novel method for assessing dissolution of aerosol inhaler products." *Int J Pharm* 255(1-2): 175-87.

Gerde, P. and P. Scholander (1989). "An experimental study on the penetration of polycyclic aromatic hydrocarbons through a model of the bronchial lining layer." *Environmental Research* 48: 287-295.

Gerde, P. and B. R. Scott (2001). "A model for absorption of low-volatile toxicants by the airway mucosa." *Inhalation Toxicology* 13(10): 903-929.

Johnson, N. F. (1994). "Phagosomal pH and glass fiber dissolution in cultured nasal epithelial calls and alveolar macrophages: A preliminary study." *Environmental Health Perspectives* 102(Suppl. 5): 97-102.

Kanapilly, G. M., O. G. Raabe, et al. (1973). "Measurement of in vitro dissolution of aerosol particles for comparision to in vivo dissolution in the lower respiratory tract after inhalation." Health Physics 24: 497-507.

Laitinen, A., L. A. Laitinen, et al. (1989). "Organisation and structure of the tracheal and bronchial blood vessels in the dog." *Journal of Anatomy* 165: 133-140.

Lundborg, M., R. Falk, et al. (1992). "Phagolysosomal pH and dissolution of cobalt oxide particles by alveolar macrophages." *Environmental Health Perspectives* 97: 153-157.

The invention claimed is:

1. A device for simulating the interaction of particles delivered to an air/blood barrier of the respiratory tract comprising:
   a perfusion chamber adapted to receive and deliver a flow of perfusion fluid;
   a semi permeable membrane coated on one side with a barrier layer adapted to interact with the particles; and
   a first sheet formed organ having a surface distributed with the particles, wherein the membrane is arranged to be a fluid contact with the perfusion fluid, while the first sheet formed organ is arranged to contact the barrier layer of the membrane, in order to simulate the dissolution of the particles in the air/blood barrier when perfusion fluid flows through the perfusion chamber, along the membrane.

2. The device according to claim 1, wherein the perfusion chamber is provided with means for establishing fluid connection with the perfusion chamber.

3. The device according to claim 1, wherein the chamber comprises:
   a second upper sheet formed organ,
   an upper distance means for attaching the second upper sheet formed organ over the membrane, and
   a lower distance means for attaching the membrane while admitting the particles to contact the barrier layer and for contacting the first sheet formed organ,
   wherein said upper distance means is provided with channels for transporting inlet and outlet perfusion fluids, respectively.

4. The device according to claim 3, wherein the sheet formed organs of the device are essentially parallel.

5. The device according to claim 3, wherein the channels are arranged to provide a flow essentially parallel to the membrane.

6. The device according to claim 1, wherein the membrane is made of polycarbonate.

7. The device according to claim 1, wherein pores of the membrane have a diameter in the range of about 0.01-1 µm.

8. The device according to claim 1, wherein the first sheet formed organ is adapted so the interaction can be studied with an optical detector.

9. The device according to claim 8, wherein the optical detector records images of the first sheet formed organ for image analysis.

10. The device according to claim 8, wherein the first sheet formed organ is illuminated and said detector measure how the light is influenced by the particles.

11. The device according to claim 1, wherein the barrier layer is made from a polycarbohydrate suspension.

12. The device according to claim 1, wherein the barrier layer comprises a dispersed surfactant.

13. A device according to claim 12, wherein the particles are distributed on the first sheet formed organ from a stream of an aerosolized dose form.

14. A device according to claim 13, wherein the aerosolized dose form comprises particles in the size range of 0.3-10 µm including at least one pharmaceutically active compound.

15. A device according to claim 1, wherein the particles are distributed on the first sheet formed organ from an exposure of the first sheet formed organ to an environment comprising the particles.

16. An arrangement for studying the dissolution of particles in the air/blood barrier of the respiratory tract comprising:
   a device according to claim 1;
   an optical detection equipment;
   means for collecting fractions of perfusion fluid; and
   means for immobilizing said device to a fixed structure.

17. An arrangement according to claim 16, wherein said immobilizing means comprise:
   an upper part with connection tubes for leading perfusion fluids to the chamber and from the chamber;
   a middle part for immobilizing the membrane against the upper distance means; and
   a lower part for pressing the first sheet formed organ, having a surface distributed with particles, against said membrane.

18. A method of preparing a device according to claim 1, comprising the steps of:
   providing a perfusion chamber adapted to receive and deliver a flow of perfusion fluid, having a wall consisting of a semi permeable membrane;
   coating said membrane with a barrier layer; and
   contacting and immobilizing the first sheet formed organ with the barrier layer, the first sheet formed organ having particles distributed on its contacting surface, so the distribution of the particles remains with minimal disturbance of the original distribution pattern.

19. A method of studying the interaction between airborne particles and an air/blood barrier of the respiratory tract comprising the steps of:
   providing a sample from an air stream of particles;
   providing an arrangement according to claim 16;
   providing a flow of perfusion fluid to the perfusion chamber;
   detecting the interaction of an agent from said air stream of particles; and/or
   collecting and analyzing samples from the perfusion fluid.

20. A method of studying interaction, according to claim 19, wherein said detection is performed with an optical detector.

21. A method according to claim 20, wherein said optical detector records images of said organ, for image analysis.

22. A method according to claim 19 comprising a gravimetric determination of the initial deposition of particles on the first sheet formed organ.

23. The device according to claim 7, wherein said organ is illuminated and said detector measures how the light is influenced by said particles.

24. The device of claim 12, wherein the dispersed surfactant comprises a phospholipid, a protein surfactant component, or a combination thereof.

* * * * *